Nov. 8, 1949 K. E. BERGSTRÖM 2,487,296
HOSE CLIP
Filed Oct. 16, 1946
FIG.1
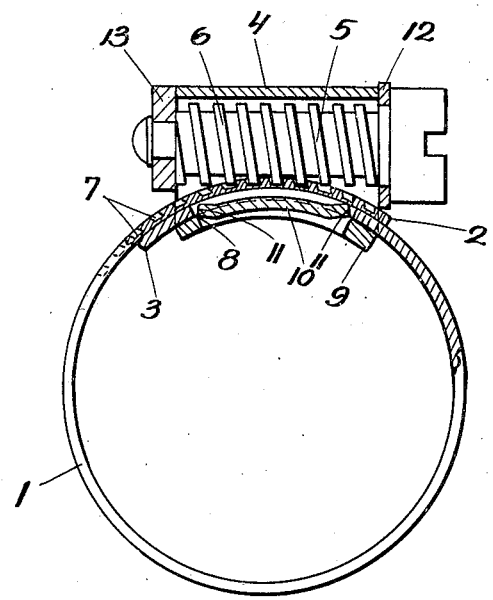
FIG.2
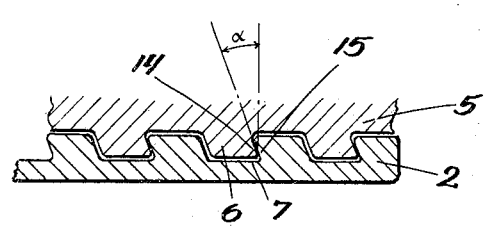
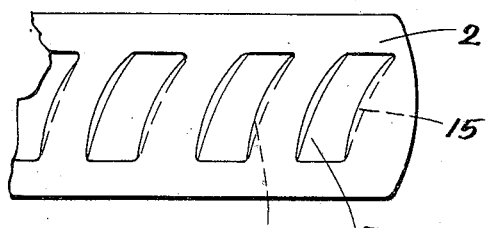
FIG.3
Inventor:
K. E. Bergström
By C. F. Henderoth
Atty Patented Nov. 8, 1949

2,487,296

UNITED STATES PATENT OFFICE 2,487,296

HOSE CLIP

Knut Edwin Bergström, Stockholm, Sweden

Application October 16, 1946, Serial No. 703,583
In Sweden October 25, 1945

4 Claims. (Cl. 24—19)

1

The present invention refers to hose clips of the type which comprise a metal strip bent to the form of a ring and having overlapping end portions which are inserted in a sleeve-like jointing member, the outer strip end at the overlap being provided on its outer face with thread grooves for engagement with a screw which is rotatably but axially non-slidably mounted in said sleeve-like jointing member and the inner end of the metal strip at the overlap being connected to the radially innermost part of the sleeve-like member which is turned inwards in the hose clip.

In the case of such hose clips it may occur that the screw when tightened hard causes the threads thereof to get loose from the thread grooves in the outer strip, inter alia owing to the sleeve-like jointing member—hereinafter referred to as sleeve—being stretched in the transverse direction.

The object of the present invention is to remove the above-mentioned defect. According to the invention, the thread grooves in the outer strip end and the threads of the screw are undercut in such a way that at the tightening of said strip end by means of the screw the engagement between the threads of the screw and the strip end is strengthened, the harder the screw is tightened. When the threads are formed in this way there is no risk for the sleeve being deformed at a high load.

The invention also refers to a method for producing the thread grooves in the strip.

In order that the invention may be easily understood and readily carried into effect, it will be described with reference to the attached drawing which illustrates a preferred form of the hose clip according to the invention by way of example:

Fig. 1 is a longitudinal section through the sleeve of the hose clip and the outer and inner ends of the strip;

Fig. 2 is a longitudinal section at a larger scale through the outer strip end (straightened) and part of the screw, illustrating the engagement between the threads of the screw and the thread grooves of the strip end;

Fig. 3 is a plan view of the strip end shown in Fig. 2.

The hose clip is substantially of a well-known type and therefore will not need to be described in detail. It consists of a metal strip 1 bent into the form of a ring and having overlapping end portions, the outer of which is designated by 2 and the inner by 3. The sleeve is designated by 4. It forms a support for a screw 5, the thread 6 of which engages in thread grooves 7 in the outer

2 strip end 2. The inner strip end 3 is provided with an aperture 8 in which engages a ridge 10 pressed inwards from the bottom 9 of the sleeve 4 into the interior of the sleeve, the ends of said ridge being cut free and forming abutment faces against the inner strip end 3 at the ends 11 of the aperture 8. The screw 5 is passed by two washers 12, 13 abutting against the ends of the sleeve.

The characteristic feature of the invention resides in the formation of the screw thread 6 and the thread grooves 7. As will be seen from Fig. 2, the co-operating edges 14 and 15 of the screw thread 6 and the thread grooves 7, respectively, are undercut. It is essential that at least those edge faces of the threads which at the tightening of the screw slide along each other are inclined. The angle $\alpha$ (Fig. 2) enclosed between the edge face 14 of the thread 6 of the screw 5 and a cross sectional plane passing through the screw at right angles to the axis thereof should preferably be not less than 3° and not greater than 10°. The value of the angle $\alpha$ can preferably be chosen at about 5°.

From Fig. 2 is clearly to be seen that the engagement between the screw thread 6 and the thread grooves 7 at a tightening of the screw is very good and that this engagement is strengthened the higher the axial stresses between the strip end 2 and the screw 5 are growing.

The thread grooves 7 are machined in the outer face of the strip end 2 preferably by means of a so-called worm hob having undercut working edges, said hob having an outer diameter which equals or only slightly exceeds the outer diameter of the screw 5. The pitch of the thread of the worm hob must naturally agree with the pitch of the thread of the screw 5. The cutting of the thread grooves in the strip end 2 is preferably carried out in such a way that the strip end is moved longitudinally of the hob during the rotation thereof so that the cutting edges of the hob work into the strip, while the latter is being fed in the longitudinal direction.

The sleeve 4 shown in Fig. 1 is assumed to be made from a tubular blank, whereby a particularly high strength is obtained. Owing to the good engagement between the screw and the strip obtained by the invention the radial stresses become relatively small, the result thereof being that it is possible to obtain a sufficiently strong hose clip having a sleeve made by bending a sheet metal strip so that the ends thereof meet at the middle of the bottom 9. The invention thus covers hose clips having sleeves 4 of both constructions.

What I claim and desire to secure by Letters Patent is:

1. A hose clip, comprising a metal strip bent into the form of a ring having overlapping ends, jointing sleeve means surrounding said overlapping ends, screw means rotatably but axially non-slidably mounted in said sleeve means tangentially of said ring and having undercut threads, said strip having undercut thread grooves formed in the outer face of the outermost of said overlapping ends and engaged by the undercut threads of said screw means, so that on tightening said screw means said undercut threads and thread grooves cause a strengthening of the engagement between said screw means and said grooved strip end.

2. A hose clip, comprising a metal strip bent into the form of a ring having overlapping ends, jointing sleeve means surrounding said overlapping ends, screw means rotatably but axially non-slidably mounted in said sleeve means tangentially of said ring and having threads with an undercut edge face enclosing an angle of about 3 to 10° with a cross-sectional plane passing through said screw means at right angles to the axis thereof, said strip having thread grooves formed in the outer face of the outermost of said overlapping ends with an undercut edge face corresponding to that of and engaged by the threads of said screw means, so that on tightening said screw means said undercut thread and thread groove faces cause a strengthening of the engagement between said screw means and said grooved strip end.

3. A hose clip, comprising a metal strip bent into the form of a ring having overlapping ends, jointing sleeve means surrounding said overlapping ends, screw means rotatably but axially non-slidably mounted in said sleeve means tangentially of said ring and having undercut threads, said strip having undercut thread grooves with segmental sides formed in the outer face of the outermost of said overlapping ends and engaged by the undercut threads of said screw means, so that on tightening said screw means said undercut threads and thread grooves cause a strengthening of the engagement between said screw means and said grooved strip end.

4. A hose clip, comprising a metal strip bent into the form of a ring having overlapping ends, jointing sleeve means surrounding said overlapping ends, screw means rotatably but axially non-slidably mounted in said sleeve means tangentially of said ring and having threads with an undercut edge face enclosing an angle of about 3° to 10° with a cross-sectional plane passing through said screw means at right angles to the axis thereof, said strip having thread grooves with segmental sides formed in the outer face of the outermost of said overlapping ends with an undercut edge face corresponding to that of the screw and engaged by the threads of said screw means, so that on tightening said screw means said undercut thread and thread groove faces cause a strengthening of the engagement between said screw means and said grooved strip end.

KNUT EDWIN BERGSTRÖM.

REFERENCES CITED

The following references are of record in the file of this patent:

UNITED STATES PATENTS

| Number | Name | Date |
|---|---|---|
| 1,365,954 | Richards | Jan. 18, 1921 |
| 1,584,935 | Hathorn | May 18, 1926 |
| 1,688,768 | Wildhaber | Oct. 23, 1928 |
| 2,395,273 | Hill | Feb. 19, 1946 |